United States Patent [19]

Morbieu et al.

[11] Patent Number: 5,172,181
[45] Date of Patent: Dec. 15, 1992

[54] LASER SYSTEM FOR MEASURING THE ANGLE OF INCIDENCE OF AN AIRCRAFT

[75] Inventors: Bertrand Morbieu, Valence; Michel Torregrosa, Beaumont Les Valence, both of France

[73] Assignee: Sextant Avionque, France

[21] Appl. No.: 659,741

[22] Filed: Feb. 21, 1991

[30] Foreign Application Priority Data

Mar. 8, 1990 [FR] France ............................ 90 02946

[51] Int. Cl.$^5$ ................................................ G01P 3/36
[52] U.S. Cl. .................................................. 356/28.5
[58] Field of Search ................................. 356/28.5, 28

[56] References Cited

U.S. PATENT DOCUMENTS

4,330,763  5/1982  Esterowitz et al.

FOREIGN PATENT DOCUMENTS

272912   6/1988  European Pat. Off.
009533   4/1980  Fed. Rep. of Germany
2582403  11/1986 France
227911   7/1987  United Kingdom

*Primary Examiner*—Mark Hellner
*Attorney, Agent, or Firm*—Rosenman & Colin

[57] ABSTRACT

A system is disclosed for measuring the angle of incidence of an aircraft, comprising at least one probe with a laser generator having a monochromatic emission spectral line, an optical emission system, an optical system receiving a monochromatic radiation back-scattered by the aerosols, means for pumping the laser generator, a detection interferometer receiving a part of the emitted laser beam and the back-scattered radiation and means for determining, after beating of the emitted beam and back-scattered beam, the Doppler frequency of the back-scattered beam and deriving therefrom the air speed along the axis of the emitted laser beam, in which system the optical emission system is adapted so as to focus the emitted beam on an air slice distant from the aircraft, the laser generator is disposed in the vicinity of the skin of the aircraft, the pumping means and the interferometer are moved inside the aircraft and the frequency of the laser spectral line is adapted so that the connections between the probe, on the one hand, and the pumping means and the interferometer, on the other, are made from monomode optical fibers with polarization maintenance.

17 Claims, 1 Drawing Sheet

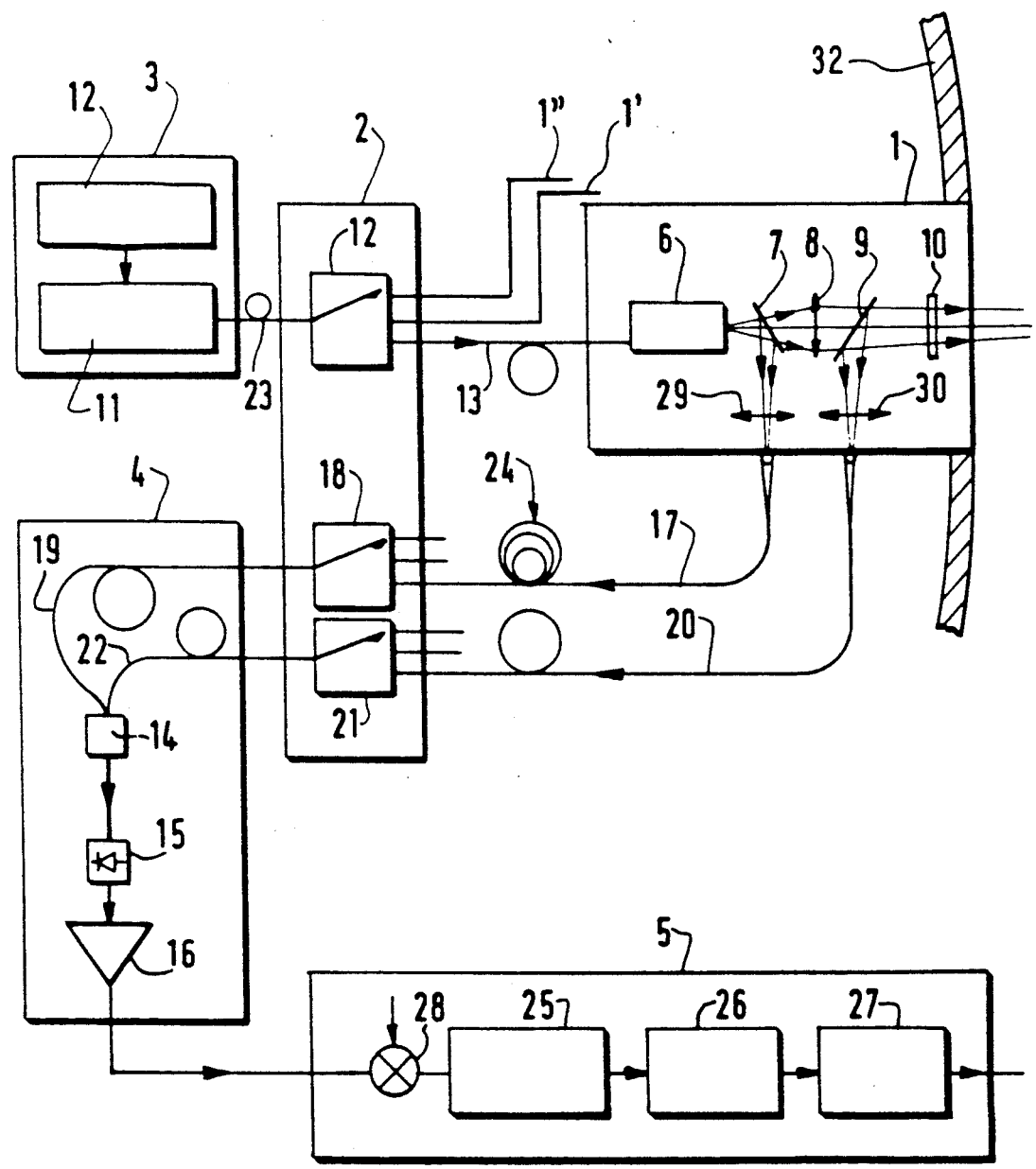

LASER SYSTEM FOR MEASURING THE ANGLE OF INCIDENCE OF AN AIRCRAFT

BACKGROUND OF THE INVENTION

A system is already known for measuring the angle of incidence of an aircraft, for example an aeroplane or a helicopter, the incidence being the angle formed between the longitudinal axis of the aircraft and the airflow, i.e. the air speed vector, which system is also known as incidence probe, which comprises a $CO_2$ laser generator with monochromatic spectral line, an optical system for emitting the laser beam, an optical system for receiving the back-scattered beam, which is also monochromatic and comes essentially from the aerosols whose movement or agitation is caused by that of the air and an interferometer receiving a part of the emitted beam and the back-scattered beam, and producing a transposition from the field of optical waves to the field of radiofrequency waves, so as to derive therefrom the Doppler back-scatter frequency and so the component of the air speed along the axis of the emitted laser beam.

Such a system is a longitudinal anemometry system.

The air speed and the incidence are parameters which may be displayed on the instrument panel of the aircraft and which serve for controlling and piloting the aircraft, for elaborating then displaying certain flight parameters of the aircraft.

But such an anemometric system which might be carried on board an aircraft would have drawbacks. A $CO_2$ laser generator, because of its cooling device, is expensive and cumbersome. The space which would moreover be necessary in order to use a $CO_2$ laser generator in such an application would be further increased by the necessary proximity of the interferometer and the pumping means of the laser generator. Since, in the application considered, namely an anemometric measurement, the laser generator would have to be located close to the "skin" of the aircraft, it can be readily seen that the $CO_2$ laser generator is finally not very appropriate for such an application, at least as mass produced equipment.

Moreover, there exists fringe anemometry and passage time anemometry which allow measurements to be made, not along the axis of the beam, but transversely to the beam and at short distances. Now, measurements at a short distance from an aircraft are subject to errors due to the aerodynamic disturbances.

SUMMARY OF THE INVENTION

The purpose of the present invention is then to provide a laser generator incidence probe making it possible to take longitudinal measurements in a sounded air slice relatively far from the aircraft, and so determine the true incidence, and in which the equipment associated with the optical head, i.e. the control and measurement equipment, may be moved inside the aircraft.

For this, the present invention provides a system for measuring the angle of incidence of an aircraft comprising at least one probe with a laser generator having a monochromatic emission spectral line, and emission optical system, an optical system receiving a monochromatic radiation back-scattered by the aerosols, means for pumping the laser generator, a detection interferometer receiving a part of the emitted laser beam and the back-scattered radiation and means for determining, after beating of the emitted beam and back-scattered beam, the Doppler frequency of the back-scattered beam and deriving therefrom the air speed along the axis of the emitted laser beam, in which system the optical emission system is adapted so as to focus the emitted beam on an air slice distant from the aircraft, the laser generator is disposed in the vicinity of the skin of the aircraft, the pumping means and the interferometer are moved inside the aircraft and the frequency of the laser spectral line is adapted so that the connections between the probe, on the one hand, and the pumping means and the interferometer, on the other, are made from monomode optical fibers with polarization maintenance.

With the invention, the probe may have a reduced size, be light and be disposed, it is true close to the skin of the aircraft, but almost anywhere depending on the available space. Because of the optical fiber connections, which are impossible with a $CO_2$ laser having a wavelength of 10.6 $\mu$m, the probe is passive, with total galvanic isolation. Finally, since a probe does not project from the skin of the aircraft, it has no adverse effect either on its aerodynamism or its furtiveness.

Preferably, the probe comprises a solid laser generator, comprising Ylf (yttrium, lanthanum, fluoride) doped with Nd (neodyme), having a wavelength of 1 $\mu$m, pumped by laser diodes and operating in a "pumping gain switching" mode.

It is also possible to use, as solid crystal laser generator, which cannot be cooled, an Ilf laser or a laser having any other crystal, doped with Holmium (Ho) with a wavelength of 2 $\mu$m, which has the advantage of being optically harmless.

Advantageously, the incidence measurement system comprises at least three identical probes disposed so as to determine the three components of the air speed vector along their respective emission axes.

In this case, the system may comprise a switching unit for connecting the pumping means cyclically to the probes and the probes to the interferometer.

BRIEF DESCRIPTION OF THE DRAWING

The invention will be better understood from the following description of the preferred embodiment of the anemometric system of the invention, with reference to the single figure which shows it schematically.

DESCRIPTION OF THE PREFERRED EMBODIMENT

The system which will be described, for measuring the incidence of an aircraft, comprises here three identical and independent probes 1, 1', 1", only one of which, 1, has been shown for the sake of clarity, an optical switching unit 2, a pumping module 3, a detection module 4 and a processing module 5.

Each probe comprises here an Nd-Ylf laser generator 6 with monochromatic emission spectral line having a wavelength $\lambda_o = 1.047$ $\mu$m, a first separating plate 7 for reflecting a local reference beam, part of the emitted beam, on to the detection module, an emission lens 8 focussing the emitted beam on an air slice, here distant by about 25 m, so undisturbed by the movement of the aircraft, a second separating plate 9, letting the emitted beam pass and reflecting on to the detection module a back-scattered beam and a $\lambda/4$ (quarter wave) plate 10. The back-scattered beam comes essentially from aerosols. Since their agitation speeds are very low, their back-scattered spectrum is also monochromatic, with pulsation $\omega_D$. The beam emitted by generator 6 has transverse rectilinear polarization oriented so that the local reference beam is reflected from plate 7.

On the outgoing beam, plate 10 transforms the rectilinear polarization into circular polarization and, on the return beam, the circular polarization of the back-scattered beam into a rectilinear polarization parallel to that of the emitted beam. The transmission, through plate 9, of the emitted beam is practically total, as also is the reflection from this plate of the back-scattered beam.

The local reference wave, reflected from plate 7, is of the form:

$$A_o = a_o \cos(\omega_o t + \phi_o) \quad (1)$$

in which $\omega_o$ is the pulsation of the laser generator such that:

$$\omega_o = 2\pi f_o = 2\pi \frac{c}{\lambda_o}$$

The back-scattered wave is of the form:

$$A_D = a_D \cos[(\omega_o + \omega_D) t + \phi_D] \quad (2)$$

in which $\omega_D$ is the back-scattered Doppler pulsation and the phase $\phi_D$ is different from the reference phase $\phi_o$.

Generator 6 is pumped by pumping laser diodes 11 controlled by a control block 12 operating in "pumping gain switching" mode and producing a concentrated pumping beam.

In fact, a back-scattered Doppler spectral line is generally widened, because of:
the speed dispersion in the sounded air slice,
possible frequency slipping of the laser generator during the emission of its pulse,
the limited duration of this pulse.

Now, the technique of switching the pumping gain allows laser pulses to be produced of a longer duration (for example 800 ns) which are subjected to very low frequency slipping, for example less than 3 MHz.$\mu s^{-1}$. Subject to compensation of the optical paths at the level of the interferometer, which will be discussed hereafter, and which makes the frequency slipping effect of the generator negligible, the width of the Doppler spectral line is satisfactory, for example less than 2 MHz.

The pumping signal is fed cyclically to each of the laser generators of the three probes by a first optical fiber 23, a switch 12 of the switching unit 2, and a second optical fiber 13.

In the figure, the three outputs of switch 12 have been shown connected respectively to the three laser generators of the three probes 1, 1', 1''. Similarly, the three outputs of the other two switches of the switching unit 2 have also been shown. The three switches are controlled in synchronism.

The detection module 4 is an interferometer, i.e. a heterodyne receiver causing the reference wave and the back-scattered wave to beat for transposing the measurement from the field of optical waves to the field of radiofrequency waves. The interferometer 4 comprises a coupler, or mixer, 14 with polarization maintenance, a photodetector 15, here an InGaS PIN photodiode and an amplifier 16. The reference wave, reflected from plate 7, is transmitted to coupler 14 and through a focussing lens 29 by a first optical fiber 17, switch 18 and a second optical fiber 19. The back-scattered wave, reflected from plate 9, is transmitted to coupler 14 and through a focussing lens 30 by a first optical fiber 20, switch 21 and a second optical fiber 22. The optical fibers 23, 13, 17, 19, 20 and 22 are monomode fibers with polarization maintenance, at present available on the market for the frequency range of the laser generators considered. To offset the difference between the outgoing and incoming optical paths, a fiber coil 24, here of about 30 m, is integrated with fiber 17.

The waves of the above relations (1) and (2) being then mixed in coupler 14, the photodiode 15 delivers a current, disregarding the DC component and the high frequency components, of the form:

$$2 a_o a_D \cos(\omega_D t + \phi_D - \phi_o)$$

After amplification (15), the signal is fed to the processing module 5.

Module 5 comprises, in series, a spectrum analyzer 25, a block 26 for seeking the spectral line, in fact the Doppler peak, and for calculating, by microcomputer, the components of the air speed vector, along the axes of the three probes, and control logic 27, the air speed vector V being drawn from the equation:

$$\omega_D = \frac{1}{\pi \lambda_o} \vec{V} \cdot \vec{u}$$

$\vec{u}$ being the unitary vector along the axis of each of the probes.

At the input of the processing module 5 a coupler 28 may be provided connected to a voltage controlled oscillator (VCO) or to a synthesizer.

It will be noted here that the usual problem of locating the axes of the probes in the reference system of the aircraft, usually carried out on the ground, is here assumed to have been solved.

It will also be noted that, for this incidence measurement, the laser generators may work with continuous or pulsed operation.

To conclude, it will be emphasized that the system which has just been described allows a true measurement to be obtained with good accuracy, with a reduced blind zone of incidence and slipping measurement, and at a rate which can be adapted to the altitude.

What is claimed is:

1. In an aircraft flying into oncoming air currents flowing along a flow direction, the aircraft having a skin bounding an interior and a longitudinal axis,
a system for measuring an angle of incidence formed between the longitudinal axis of the aircraft and the flow direction of the oncoming air currents, said system comprising:
(a) at least one probe mounted adjacent the skin of the aircraft, said one probe including
(i) laser means for emitting a main laser beam along an emission axis,
(ii) means for deriving a reference laser beam from the main laser beam,
(iii) means for focusing the main laser beam at long range ahead of the aircraft in the oncoming air currents, and
(iv) means for collecting a back-scattered laser beam having a Doppler frequency scattered off the oncoming air currents;
(b) pump means mounted within the aircraft interior remotely from said one probe, and operative for pumping the laser means with a pumping light beam;
(c) a first set of elongated, optical fibers extending between, and interconnecting, the pump means and said one probe, said first set of fibers being operative for conveying the pumping light beam from the pump means to said one probe;
(d) detection means mounted within the aircraft interior remotely from said one probe, said detection means including
 (i) means for mixing the reference laser beam and the back-scattered laser beam to obtain a radio frequency beat signal,
 (ii) means for processing the beat signal to obtain the Doppler frequency of the back-scattered laser beam, and
 (iii) means for determining the angle of incidence from the Doppler frequency; and
(e) a second set of elongated, optical fibers extending between, and interconnecting, the detection means and said one probe, said second set of fibers being operative for conveying the reference laser beam and the back-scattered laser beam from said one probe to the detection means.

2. The system as recited in claim 1, wherein the laser means is a solid crystal laser.

3. The system as recited in claim 2, wherein the solid crystal laser is constituted of neodyme-doped yttrium, lanthanum and fluoride.

4. The system as recited in claim 2, wherein the solid crystal laser is doped with holmium.

5. The system as recited in claim 1, wherein the deriving means is a separation plate having a transmissive portion through which the main laser beam passes, and a reflective portion for reflecting the reference laser beam from the emission axis.

6. The system as recited in claim 1, wherein the focusing means is a focusing lens.

7. The system as recited in claim 1, wherein the collecting means is a collection plate having a transmissive portion through which the main laser beam passes, and a reflective portion for reflecting the back-scattered laser beam away from the emission axis.

8. The system as recited in claim 1, wherein the laser means emits the main laser beam with a rectilinear polarization, and wherein said one probe includes means for changing the rectilinear polarization to a generally circular polarization outside said one probe.

9. The system as recited in claim 1, wherein the pump means includes a plurality of laser pumping diodes, and control means for pulsing the laser diodes.

10. The system as recited in claim 1, wherein each set of optical fibers includes monomode fibers for conveying light.

11. The system as recited in claim 1, wherein the second set of fibers includes a first group of fibers for conveying the reference laser beam, and a second group of fibers for conveying the back-scattered laser beam, and wherein the first group of fibers includes a fiber coil for compensating for the different optical paths traveled by the reference and back-scattered laser beams.

12. The system as recited in claim 1, wherein the mixing means is a heterodyne receiver.

13. The system as recited in claim 1, wherein the processing means includes a spectral analyzer.

14. The system as recited in claim 1, wherein the determining means also determines air speed along the emission axis.

15. The system as recited in claim 1; and further comprising two additional probes identical to said one probe, each probe emitting a main laser beam along a different emission axis.

16. The system as recited in claim 15; and further comprising switching means for cyclically connecting each probe to the pump means.

17. The system as recited in claim 15; and further comprising switching means for cyclically connecting each probe to the detection means.

* * * * *